INVENTOR
ROBERT M. FANO
BY, [signature]
ATTORNEY

July 22, 1969 R. M. FANO 3,457,562

ERROR CORRECTING SEQUENTIAL DECODER

Filed June 22, 1964 4 Sheets-Sheet 2

INVENTOR
ROBERT M. FANO
BY
[signature]
ATTORNEY

*INVENTOR*
ROBERT M. FANO
*BY,*
[signature]
*ATTORNEY*

INVENTOR.
ROBERT M. FANO
BY Martin M. Santa
ATTY.

United States Patent Office 3,457,562

Patented July 22, 1969

3,457,562

ERROR CORRECTING SEQUENTIAL DECODER

Robert M. Fano, Lexington, Mass., assignor to Massachusetts Institute of Technology, Cambridge, Mass., a corporation of Massachusetts Filed June 22, 1964, Ser. No. 376,877
Int. Cl. H041 3/02
U.S. Cl. 340—347 8 Claims

ABSTRACT OF THE DISCLOSURE

A sequential decoding receiver containing an encoder identical to that used in the transmitter whose signals it is attempting to decode. The information bits and parity bits which are detected by the receiver are compared with the information bits and parity bits generated within the receiver. The Hamming distance is computed for each generated information bit. The distance has subtracted from it a magnitude which will cause the difference to be a positive quantity where the information and parity bits correspond and a negative quantity where noise disturbs the received signal. A running sum of these positive and negative quantities is compared with a threshold which increases in stepwise fashion. Where the running sum drops below the threshold, the detection process ceases to go forward and reverses to reexamine previously assumed information bits until a sequence of information bits which results in the running sum once again assuming an increasingly positive value is obtained. Decoded information bits are available as an output where a predetermined bit distance exists between the available bit and the information bit which is then being examined.

This invention relates to a method and apparatus for decoding noise-disturbed digital data and in particular to a method and apparatus of probabilistic decoding of noise-disturbed sequentially encoded digital data.

The essence of sequential encoding is the replacement of the "jumping" constraint of block encoding by a "sliding" constraint. In an $(n,k)$ block code, a block of $k$ information bits are caused to provide $(n-k)$ parity bits which depend only on these $k$ information bits. The $k$ information bits and the corresponding $(n-k)$ parity bits are transmitted as a block of $n$ bits and are decoded independently of other similarly obtained blocks of $n$ bits. In contrast, in sequential coding the parity bits are interspersed between successive information bits with each parity bit dependent upon the previous $k$ information bits. Thus, sequential encoding may be considered to have a "sliding" constraint of $k$ bits which looks successively at $k$ information bits which differ by only one bit for each look. The encoding operation can be represented in terms of a tree in which the information digits select at each node of the tree the branch to be followed. The path in the tree resulting from the successive selections constitutes the encoder output.

The sequential decoding operation may be regarded as the process of determining the path in the tree followed by the encoder. As the decoder proceeds to reconstruct a path through a tree based upon a received sequence, it compares the probability of the path that it is currently exploring against a threshold determined by the current noise level that the decoder expects. If the comparison is favorable (the path looks "sufficiently probable"), the decoder continues forward in the tree. If the comparison is unfavorable then either the decoder is on the wrong path because of an atypical noise event that occurred sometime previously or the decoder is on the correct path and an atypical noise event is now occurring.

At this point the decoder makes the assumption that the path is incorrect. The decoder reverses itself and searches back in the attempt to find a more probable path. The distance it is allowed to go back in this search depends upon the particular decoding algorithm. For the moment assume that the decoder searches back until it either finds a "sufficiently probable" path or it retreats some fixed number $d_0$ nodes back without finding a good path. The former case implies that the first path was indeed incorrect as hypothesized and that the new path is more likely correct. The decoder thereupon proceeds forward. The latter case implies that the first path may still be correct and only appears improbable because of atypical noise behavior. The decoder relaxes its criterion of "sufficiently probable" and proceeds as before with a new threshold based upon the current assumption of the noise level.

A particular decoding algorithm must specify the definition of "sufficiently probable" as applied to the decoding threshold; the number of nodes the decoder is allowed to search back in the attempt to find a good path before relaxing the threshold; and lastly, the criteria used to make final or irrevocable decisions about branching nodes, and the criteria for releasing a decoded digit to a user.

One possible algorithm which may be used in a sequential decoder will have the above properties tied to a fixed decoding constraint length K. This form of algorithm has the property that the final decoding of a digit and the tree search are intimately related. A digit is decoded whenever a good path K branches long stemming from that digit is found. Such an algorithm is used in the sequential decoder described by K. E. Perry and J. M. Wozencraft, I.R.E. Transactions on Information Theory, vol. IT–8, No. 5, September 1962.

In the algorithm used in the method of decoding of this invention the decoding is not dependent on a fixed decoding constraint length K. The algorithm uses only the minimum number of digits possible to cause a running sum within the decoder to exceed a given threshold. This procedure results in the decoding of bits which on the average is faster than when a fixed number K of bits must be used in each bit decoding procedure. Also, the algorithm of this invention uses a simple decisional process in its decoding procedure which requires apparatus which is less complex than that required to implement the algorithm referred to in the preceding paragraph.

It is, therefore, an object of this invention to provide an improved sequential decoder.

It is a further object to provide a faster and less complex sequential decoder.

Other objects and features of the invention will be made apparent from the following detailed description of an embodiment of the invention in which.

Figure 1:
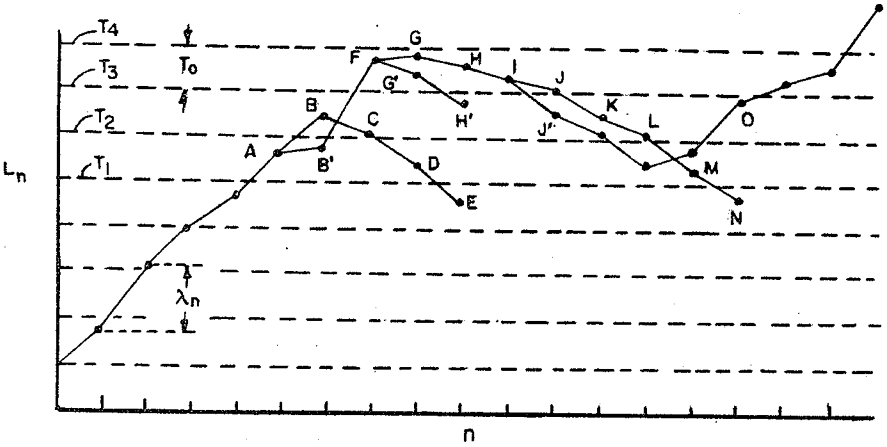
FIGURE 1 is a graph showing the typical behavior of the running sum $L_n$ along various tree paths as a function of word position $n$.

The method of sequential decoding of this invention requires that the decoder generate information and parity bits by apparatus identiual to that of the sequential encoder from which information and parity bits are being received. The decoding procedure will be described for the binary symmetric channel where the Hamming distance is a convenient measure of the probability of occurrence of a branch. The decoder generates an information and parity bit and their complements and calculates the Hamming distances between the received and locally generated bits for each branch. The smallest Hamming distance shall be designated as A, while the other will be B. A distance $\lambda_n$ is calculated for each branch from a node. In attempting to go forward in the decoding process, the largest value of $\lambda_n = d_0 - A$ at each node is always tried first and subsequently, if a failure occurs, there may be occasion to use the smaller value of $\lambda_n = d_0 - B$. The constant $d_0$ is adjusted to minimize the number of computations and when so adjusted will cause the average slope of the correct path to be positive and the average slope of an incorrect path to be negative. A running sum of the value of $\lambda_n$ for the path taken at each node is kept and designated as $L_n$, the subscript $n$ referring to the word position at which $L_n$ is determined. Thus, starting from a reference node, an incorrect path will eventually fall below any given threshold, whereas there will always exist a threshold T which the correct path will everywhere exceed. Consequently, a threshold T may be used to detect an incorrect path. A typical behavior of $L_n$ as a function of word position $n$ is shown in FIGURE 1, where occasional incorrect information bits or parity bits are received by the decoder.

A decoding procedure is described in which the decoder moves forward or backward from node to node depending on whether the value of L at the node in question is larger or smaller than a threshold T. The value of T is increased or decreased in steps of some appropriate magnitude $T_0$. $T_0$ is adjusted in magnitude to minimize the number of computations for successful decoding. Assume that the decoder is at some node of order $n$ and attempts to move forward by selecting the most probable branch among those not yet tried. If the resulting value of $L_{n+1}$ exceeds the threshold T, the branch is accepted and T is reset to the largest possible value not exceeding $L_{n+1}$. If, instead, $L_{n+1}$ is smaller than T, the decoder rejects the branch and moves back to the anode of order $n-1$. If $L_{n-1} \geq T$, the decoder attempts again to move forward by selecting the most probable branch among those not yet tried, or, if all the branches stemming from that node have already been tried, it moves back to the anode of order $n-2$. The decoder moves forward and backwards in this manner until it is forced back to a node for which the value L is smaller than the current threshold T.

The implication of the decoder being forced back to a node for which L is smaller than the current threshold is that all the paths stemming from that node contain at least a node for which L falls below the threshold. This situation may arise because of a mistake at that node or at some preceding node, as illustrated in FIGURE 1 by the first curve 10 branching off above the correct curve 11. It may also result from the fact that, because of unusually severe channel disturbances, the values of L along the correct path reach a maximum and then decrease to a minimum before rising again, as illustrated by the main curve 11 in FIGURE 1. In either case the threshold must be reduced by $T_0$ in order to allow the decoder to proceed.

After the threshold has been reduced, the decoder attempts again to move forward by selecting the most probable branch just as if it had never gone beyond the node at which the threshold had to be reduced. This leads the decoder to retrace all the paths previously examined to see whether L remains above the new threshold along any one of them. Of course, T cannot be allowed to increase while the decoder is retracing any one of these paths, until it reaches a previously unexplored branch. Otherwise, the decoder would keep retracing the same path over and over again.

If L remains above the new threshold along the correct path, the decoder will be able to continue beyond the point at which it was previously forced back, and the threshold will be permitted to rise again as discussed above. If, instead, L still falls below the reduced threshold at some node of the correct path or an error has occurred at some preceding node for which L is smaller than the reduced threshold, the threshold will have to be further reduced by $T_0$. This process is continued until the threshold becomes smaller than the smallest value of L along the correct path, or smaller than the value of L at the node at which the mistake has taken place.

To illustrate the decoding procedure outlined above, the paths of FIGURE 1 will be examined in more detail. Assume that the decoder has been operating successfully up to node A and that the threshold is $T_1$. Node B is the best path going forward from node A and increases the threshold to $T_2$. Nodes C and D represent the best paths and it is seen that a failure occurs in trying to go to node D since it is smaller than $T_2$. The alternate path from C need not be tried since it is not as good as the first try. The alternate path from B is also assumed to fail. The decoder goes back to node A in order to try the alternate path. In going to A the threshold must be reduced by $T_0$ to $T_1$. The best path forward A, B, C, D, E is tried again at the reduced threshold $T_1$ (the threshold not being allowered to rise until there is a success on a new path) but is seen to fail in trying to go to E. It is assumed that an attempt to go forward on an alternate path from C and B also failed and are not shown.

The alternate path from A to B′ is a success since it does not fall below $T_1$, but does not result in a change in the threshold $T_1$. The best path from B′ results in a success at node F and raises the threshold to $T_3$. A failure occurs in trying to go to node K along the best path for this threshold value $T_3$. Backing up to I and attempting to go forward results in a failure trying to go to J′. Alternate paths starting from H, G and F in that order are also assumed to fail. The alternate path from node F is drawn to illustrate that in going forward from F the alternate path is taken ending in G′ but in going forward from G′ the best path is chosen but fails in trying to get to H′.

The failure to exceed $T_3$ on any path from F causes the decoder return to B′. However, the threshold is only reduced by $T_0$ to $T_2$ and the best path forward from B′ investigated for $T = T_2$ and seen to fail in trying to go to M. It is assumed that all other paths from L, K, J, I, H, G and F in that order also fail to exceed threshold $T_2$. These failures cause the decoder to return to B′ where the threshold is again reduced by $T_0$ from $T_2$ to $T_1$. The best path forward from B′ results in a failure in trying to go to node N. The alternate paths from L, K and J are assumed to fail. However, at node I the alternate path is to J′ and a path from J′ results in path which does not fall below $T_1$. Since node O terminates a path which was never a success previously, and since it exceeds the threshold $T_1$ by more than T, the threshold is allowed to rise to $T_2$.

Figure 2:
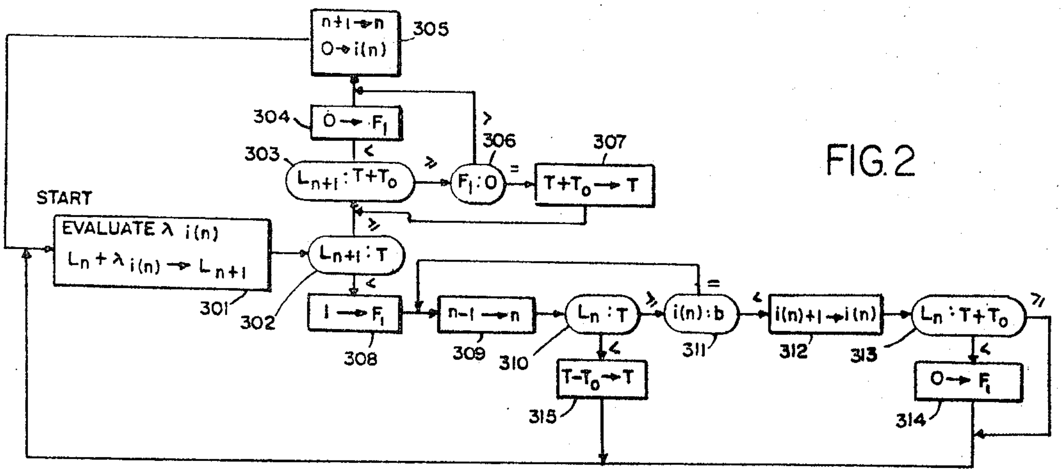
FIGURE 2 is a flow chart of the sequential-decoding procedure.

FIGURE 2 illustrates the flow chart of the sequential decoding procedure. This flow chart is a convenient way for expressing the algorithm upon which the sequential decoding procedure of this invention is based. In order to explain the operation of the sequential decoding procedure by means of the diagram of FIGURE 2, it will be assumed that the machine has been operating and that the word at position $n$ is being processed. The following Table I will assist in interpreting the flow chart.

TABLE I $1 \rightarrow F$—set F equal to 1
$L_n + \lambda_{i(n)} \rightarrow L_{n+1}$—set $L_{n+1}$ equal to $L_n + \lambda_{i(n)}$
$n+1 \rightarrow n$—substitute $n+1$ for $n$ (increase $n$ by one)
$i(n)+1 \rightarrow i(n)$—substitute $i(n)+1$ for $i(n)$ (increase $n$ by one)
$T + T_0 \rightarrow T$—substitute $T + T_0$ for T (increase T by $T_0$)
$L_{n+1} : T$—compare $L_{n+1}$ and T; follow path marked $\geq$ if $L_{n+1} \geq T$.

In FIGURE 2, the starting point in the decoding procedure is considered to be in unit 301. A value $\lambda_{i(n)}$ for the word position $n$ being decoded is first calculated. The subscript $i(n)$ identifies the particular path which is being used in the calculation of the $\lambda_{i(n)}$. Whenever a node which has never been processed before is reached in the decoding process, or which has been passed-by when the decoder is going backward in its decoding process, the value of $i(n)$ for that node will be caused to be zero, $i(n)=i(0)$. This value of $i(0)$ will cause $\lambda_{i(0)}$ to be the largest positive value of the possible values of $\lambda$ on the other paths from that node. The next value of $i(n)$ gives the next largest positive value of $\lambda$. The $i(n)$ in unit 301 indicates that the value of $\lambda_{i(n)}$ to be calculated is to be the largest of those still available from that node. The value of $\lambda_{i(n)}$ is added to the value of $L_n$ to provide $L_{n+1}$. $L_n$ is the running sum of all previous $\lambda$'s of the nodes up to and including the node of order $n$. The value of $L_n$ may be needed later if the decoder is forced back to the $n^{th}$ node, and therefore must be stored or recomputed when needed. For the stake of simplicity, the chart of FIGURE 2 assumes that $L_n$ is stored for each value of $n$.

The value of $L_{n+1}$ is compared to the threshold value T in comparison unit 302. If $L_{n+1}$ is greater than T, there has been a success and the decoder will index itself to the next word in the forward direction at location $n+1$. This indexing occurs in unit 305 where $n+1\rightarrow n$ means that the word location has been increased by one and the new word location will henceforth be identified as $n$. Unit 305 also causes the path indexer to return to the zero state which is to be interpreted as directing the decoder to choose the best path (or alternately expressed the greatest distance $\lambda_{i(n)}$) from the node $L_n$ of the new word position $n$.

When there has been a success the value of $L_{n+1}$ is also examined to determine whether the threshold can be increased from T to $T+T_0$ before the word at the new $n$ position is processed in unit 301. After it has been determined that $L_{n+1}\geq T$ in unit 302 and that there is a success in the decoding process, the value of $L_{n+1}$ is compared to $T+T_0$ in unit 303 to determine whether it is possible to consider raising the threshold to a new value $T+T_0$. If $L_{n+1}<T+T_0$, the threshold cannot be raised and a binary variable $F_1$ is caused to be put into its zero state as indicated in unit 304. This has significance where there has previously been a failure to decode successfully and $F_1$ was then set equal to 1, $F_1=1$.

The binary variable $F_1$ is used to control a gate which allows or prevents the threshold from increasing depending on whether $F_1=0$ or $F_1=1$ respectively. Thus, $F_1$ must be set equal to 0 when the decoder selects a branch for the first time, and equal to 1 when the branch is being retraced after a reduction of threshold. The value of $F_1$ is set equal to 1 each time a branch is rejected; it is reset equal to 0 before a new branch is selected only if $T\leq L_n<T+T_0$ for the node to which the decoder is forced back. The value $F_1$ is reset equal to 0 after a branch is accepted if $T\leq L_{n+1}<T+T_0$ for the node at which the branch terminates. It can be checked that, after a reduction of threshold, $F_1$ remains equal to 1 while a path is being retracted, and it is reset equal to 0 at the node at which the value of L falls below the previous threshold.

Regardless of the value of $F_1$, a decoding success at unit 302 causes the word position to index to the next higher position.

Considering unit 303 again but this time for the case where $L_{n+1}\geq T+T_0$ it is seen that subsequent decoding processes depend upon the state of $F_1$ in unit 306. If $F_1=1$ ($F_1>0$), unit 306 directs that the threshold not increase and that the value of $L_n$ at the next word position be examined to see if it exceeds the original value of the threshold T. However, if $F_1=0$, the threshold is allowed to increase and this increase occurs by the action of unit 307 which raises the threshold to $T+T_0$. The new threshold value is then used in unit 303 to see if the threshold can be increased by $T_0$ again. Eventually $L_{n+1}$ will be less than $T+T_0$ and the indexing to the new word position $N+1\rightarrow n$ will occur.

Assume that instead of a success at unit 302, that there had been a failure, $L_{n+1}$ was less than the threshold T. This failure causes the binary variable $F_1$ to assume the state $F_1=1$ in unit 308. The failure also causes the decoding procedure to begin its backward search. The indexing of the word position by unit 309 causes the previous word at position $(n-1)$ to be put into the processing unit 301. Thus the symbol $n$ will now represent the word at position $n-1$ relative the original $n$. The value of $L_n$ (at the new word position one position earlier in time, or backwards in the decoder memory) is compared in unit 310 to the same threshold value T as used in unit 302. If $L_n<T$, unit 310 causes the threshold T to be reduced to $T-T_0$ in unit 315. The decoding steps of units 301 and 302 are then tried again but at the new threshold value $T-T_0$ and for the new word position $n$.

If $L_n$ is greater than T in unit 310, the path $i(n)$ which has been followed in previous attempts to go forward from node $n$ is determined to see what paths remain to be tested in the forward direction. If the index of $i(n)$ is a number equal to the total number of possible forward paths $b$, all possible forward paths have been examined and unit 311 has the condition $i(n)=b$. The word index unit 309 then causes the previous word to be considered. It should be noted that $i(n)$ is set equal to zero for a word when it is passed by the decoder going in a backward direction.

If $i(n)<b$ for the node, all possible forward paths from the node have not been examined and $i(n)$ is increased by 1 in unit 312 so that the best of the remaining paths for the node is examined in unit 301 with $\lambda_{i(n)}$ evaluated for the new path.

The value of $L_n$ of unit 310 is also compared with $T+T_0$ in unit 313. If the value of $L_n$ is greater than $n$ equal to $T+T_0$, the value of $F_1$ is not changed from its value of $F_1=1$ established in unit 308 after the failure in unit 302. However, if $L_n$ is less than $T+T_0$, the value of $F_1$ is changed from 1 to 0 in unit 314. If the value of $L_n$ is less than $T+T_0$ in unit 313, the value of $F_1$ is changed to 0, thus allowing the threshold to change.

All possible conditions have been considered in the above discussion of the flow chart of FIGURE 2 and the functions of the various units have been determined. The application of the flow chart to a specific situation will next be considered.

Figure 3:
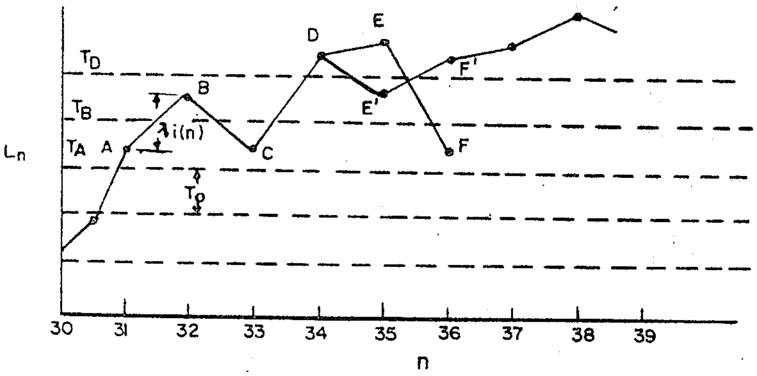
FIGURE 3 is a graph of $L_n$ used to illustrate the flow chart of FIGURE 2.

The flow chart of FIGURE 2 gives the logic steps by which the paths of FIGURE 3 are determined. Let it be assumed that the decoding procedure has been going on for some time and that the decoder has stored in it all the necessary information.

In order to demonstrate the logic steps which are taken when the decoder is decoding successfully, note A is first considered. The value of the amplitude of node A is stored in the decoder as a value of $L_n$ where $L_n$ is a numerical value stored in a storage unit such as a register, which will be called the L register. How the value of $L_n$ is obtained will be apparent from subsequent discussion. The word position which will be examined is assigned the identification numeral 31. If it is assumed that the first word examined by the decoder was in word position one, the value $L_n(=A)$ at word position 31 is the sum of the $\lambda_{i(n)}$'s of the previous 30 words. The value of $\lambda_{i(n)}$ is calculated in unit 301 by using the information bit and parity bit contained in word position 31 and generated values of information and parity bits. This value of $\lambda_{i(n)}$ is added to $L_n(=A)$ in unit 301 to provide a value $L_{n+1}$. $\lambda_{i(n)}$ is a measure of the distance between the received bits and the generated bits and is chosen to cause the average slope of the correct path through the decoder to be positive and the average slope of an incorrect path to be negative. It is assumed that the value of $\lambda_{i(n)}$ calculated at word position 31 is positive and results in a $L_{n+1}(=B)$ exceeding $T_A$ by more than the threshold increment $T_0$. This value of $L_{n+1}(=B)$ is compared to threshold $T(=T_A)$ in comparison unit 302 and found to exceed $T_A$1. This condition allows $L_{n+1}$ to be further processed in unit 303 to determine whether it exceeds $T+T_0(=T_A+T_0)$. Inspection of FIGURE 3 shows that node B does exceed $T_A+T_0$ in which event unit 306 is determinative of the next operation. If the decoder has been experiencing success at each node since the last threshold increase, a control F1 is caused to assume the $F1=0$ state. It is assumed that $F1=0$ at the time $L_{n+1}(=B)$ is computed. In this event, unit 306 will cause unit 307 to increase the threshold by the increment $T_0$, thus raising the threshold to $T_B$. This new value of threshold voltage $T_B$ is then used in unit 303 to compare $L_{n+1}(=B)$ with $T+T_0(=T_B+T_0)$. It is seen that $B<T_B+T_0$ and therefore unit 304 causes control F1 to be set to 0 if it was not already in this state. Following this operation, unit 305 causes the word index $n$ to increase to $(n+1)$, to word position 32; and $i(n)$ to be set to zero in order that the best path be first chosen in trying to proceed from node B to node C.

Assume that the decoder has been going forward without a failure up to node B. The value of L at node B is $L_n$. The value of $\lambda_{i(n)}$ is evaluated in unit 301 for the most likely path from node B. Node C is obtained. The value of L for node C is identified as $L_{n+1}$. Since the decoder has been successfully decoding up to and including node B, the threshold value T has been increasing and is $T_B$. The value of $L_{n+1}$ at C, is compared to $T_B$ in comparison unit 302. In the case under consideration, $L_{n+1}(=C)$ is less than $T(=T_B)$ and a "failure" occurs. This failure causes the flip-flop F1 in unit 308 to assume the "one" state. Since the decoder has failed in trying to go forward on the most likely path from node B, it is necessary to go backward to the previous node A. In order to do this, the word position $n$ at which the decoder is operating must be shifted back one word position as indicated by unit 309. From this point on, the subscript $n$ on $L_n$ refers to the word position corresponding to the node A. The value of $L_n$ at node A is seen to be less than $T(=T_B)$, thus unit 315 reduces the value of the threshold $T_B$ by $T_0$ to provide the threshold $T_A$. The value of T throughout the logic diagram now assumes the value $T_A$. The next step is to evaluate $\lambda_{i(n)}$ for the node A. Since there has been a backward shift from node B to A, the decoder causes the value of $i(n)$ in word position 31 to be that which was previously found to provide the most probable path (minimum Hamming distance for a binary system). In the situation represented in FIGURE 3, the decoder will retrace the path from A to B. In other words, the forward path will be the same as on the first forward success, the only difference being that a success at node B will not cause the threshold to rise from $T_A$ to $T_B$, since a path is being retraced. The decoding rule provides that the threshold can be increased only if there is a success on a new path. Node B is compared with $T(=T_A)$ in comparison unit 302 and found to be larger than $T_A$. Therefore, $L_{n+1}(=B)$ is next compared with $$T+T_0(=T_A+T_0)$$

in comparison unit 303. For node B, $L_{n+L}>T_A+T_0$ but since $F1=1$ because of the previous failure in trying to go to C, unit 306 directs that the next operation will be in unit 305 where the value of $n$ is increased to $n+1$ to cause the word at position $(n+1)=32$ in memory to be next processed. The threshold increasing unit 307 is not activated and T remains $T_A$.

The next step is to evaluate $\lambda_{i(n)}$ $(=\lambda_0$ for the best path) for word position 32. As earlier, the best path from B going forward is to node C, thus the value of $L_{n+1}$ provided by unit 301 is the magnitude of node C, which earlier resulted in a failure when compared with threshold $T_B$. However, at the reduced threshold $T_A$, node C is seen to exceed $T(=T_A)$ in unit 302 and a success at C is obtained. The comparison of $L_{n+1}(=C)$ with $T+T_0(=T_A+T_0=T_B)$ in unit 303 reveals that $L_{n+1}<T+T_0$, therefore, unit 304 causes F1 to be set to 0.

The significance of setting F1 to 0 is that the threshold is allowed to increase thereafter. The limitation imposed by units 302 and 303, that $T<L_{n+1}<T+T_0$ in order to restore F1 to 0 from the $F1=1$ state is the necessary condition for the decoder to make the decision that the node corresponding to $L_{n+1}$ is the termination of a new successful path which had never been successfully traversed before.

The success at node C causes the next word in the memory at position 33 to be brought into unit 301 where the best path from node C is calculated and is assumed to provide the node D. Node D is seen to exceed the threshold $T(=T_A)$ by 2 $T_0$ and for this reason is of special interest since this brings into effect unit 307 which causes the threshold T to increase twice, once from $T_A$ to $T_B$ and then from $T_B$ to $T_D$. The magnitude of node D, $L_{n+1}$, is compared with $T(=T_A)$ in unit 302 and found to be greater. Unit 303 then compares $L_{n+1}(=D)$ with $T+T_0(=T_A+T_0)$. The success at node C results in F1 becoming zero which then allows unit 307 to increase the threshold $T(=T_A)$ to $T(=T_B)$. The new value of $T+T_0(=T_B+T_0)$ is used in comparison unit 303 where $L_{n+1}(=D)$ is compared to $T_B+T_0$ and again found to be larger. Again, since F1 is still 0, unit 307 increases the threshold $T(=T_B)$ by $T_0$ to $T(=T_D)$. $T_D$ is then the new value of the threshold T. For this value of $T(=T_D)$, $L_{n+1}(=D)<T_D+T_0$ in unit 303, thereby causing unit 304 to set F equal to 0, (a state in which it already was since C had been accepted as a success). Once again unit 305 causes the word address to increase by one to word address 34 and the most probable or best path $i(o)$ from node D to be chosen.

It will be assumed that node $E(n=35)$ is next obtained as the most probable node and a success achieved since $L_{n+1}$ (node E) is greater than $T_D$. Since E is not greater than $T_D+T_0$, the threshold is not raised.

The decoder advances to the next word position, $n=36$, and the most probable path in unit 301 goes to node F. It is seen that a failure occurs at node F since it is less than the threshold $T_D$. The decoder then goes into the backward mode of operation just as when there was a failure at node C. Going backward from node E to node D, the data stored in the memory at word position 34 contains the information that the best path $i(n)=0$ has already been tried. Therefore, the next best or alternate path $i(n)=1$ should be tried next when going forward from node D. Unit 311 determines that the one path already tried, $i(n)=0$, is less than the number of possible forward paths $b(b=1$ in the illustration). Since $i(n)<b$, unit 312 increases $i(n)$ by one and this value $i(n)=1$ will be used in unit 301 in calculating a $\lambda_{i(n)}=\lambda_1$ different from the best path $\lambda_0$. $\lambda_1$ will result in the decoder going to node E'. Further in order to determine whether $F_1$ is to be changed to 0 the value of $L_n$ at node D is compared with $T+T_0=T_D+T_0$ in unit 313. In the illustration node D is less than $T_D+T_0$, and therefore, $F_1$ is set to 0 in unit 314 signifying that the threshold may be raised if in goig forward from node D a node is reached whose amplitude is greater than $T_D+T_0$.

The new value of $\lambda_{i(n)}=\lambda_1$ corresponding to the second best path from node D is calculated in unit 301 and terminates at node E'. It is seen that E' is below threshold $T_D$ and thus the second and last path from D fails. The value of $F_1$ is set to 1 in unit 308 because of the failure. Unit 311 determines that $i(n)=b$ since both paths going forward from D have been examined and have failed to exceed threshold $T_D$. Unit 309 reduces the word position from $n=34$ to $n=33$ resulting in $L_n=C$. This value of $L_n$ is less than $T_D$ and therefore units 310 and 315 cause the threshold $T_D$ to be reduced by $T_0$ to $T_B$. Unit 301 then evaluates the best path going forward from node C. Success occurs at node D but the threshold does not increase. The reason for the threshold not increasing is seen by examining the path terminating at node D. Although $L_{n+1}(=D)>T(T=T_B)$ in unit 302, the criteria established by unit 303 that $L_{n+1}(=D)>T+T_0$ $$(T_B+T_0=T_D)$$

in order to cause $F_1$ to become 0 is not satisfied. Therefore, the value of $F_1=1$ established by the failure trying to go to node F continues, and the threshold cannot be raised. Similarly, the success at node E does not increase the threshold. A failure occurs in trying to go to node F since it is less than the threshold $T_B$.

The failure when trying to go forward from node E causes unit 309 to reduce the word position to $n=34$. Since $D>T_B$ in unit 310 and $i(n)=0$ and $b=1$ in unit 311, the alternate path from node D is tried. $L_n$ at D is greater than $T_B+T_0$ in unit 313 thus leaving $F_1=1$. Evaluating $\lambda_1$ at D for the alternate path results in node E'. $L_{n+1}(=E')$ is greater than $T=T_B$, thus producing a success in unit 302 and bringing unit 303 into play. $L_{n+1}(=E')$ is compared with $T_B+T_0$ in unit 303. Since $E'<T_B+T_0$, unit 304 sets $F_1=0$. It is assumed that the next node is F'. Since $F'>T_B+T_0$ and $F_1=0$, the threshold is allowed to rise to $T_D$ and the decoder continues to decode subsequent word positions.

The description of the decoding procedure of FIGURE 2 has assumed ever increasing values $L_n$ and T for ease of discussion and graphical presentation. In practice, however, a decoder would produce the same end result by subtracting $T_0$ from $L_n$ when $L_n$ exceeds $T_0$ and adding $T_0$ when $L_n$ becomes negative. The decoder to be described subsequently operates in this latter way.

Figure 4:
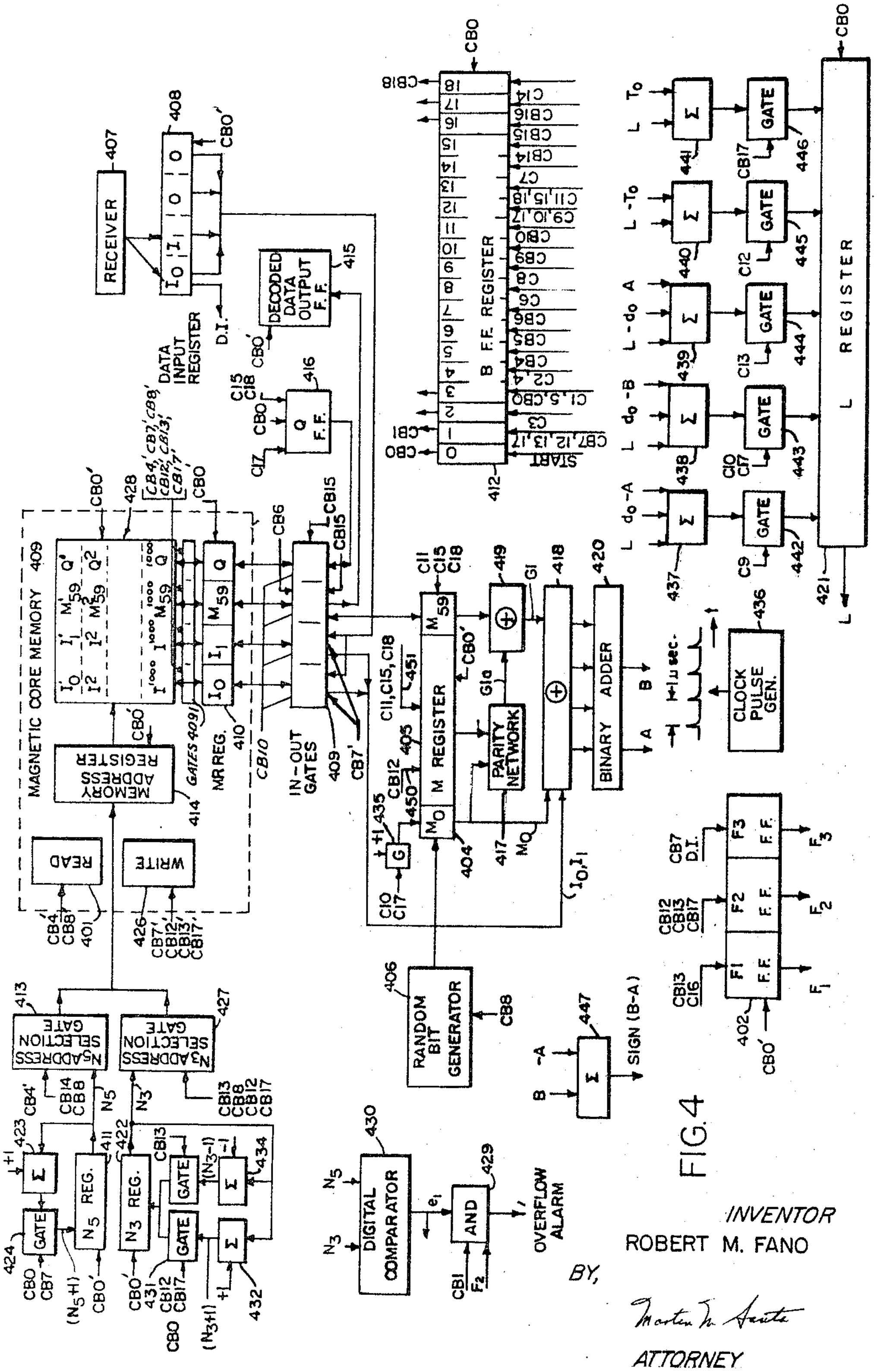
FIGURE 4 is a block diagram of a decoder capable of executing the algorithm of this invention.

An embodiment of a decoder capable of executing the steps shown in the flow chart of FIGURE 2 is shown in FIGURE 4. This embodiment is capable of decoding sequentially encoded bits where there is an information digit $I_0$ alternated with a parity digit I, which together constitute a word. The digit is assumed to have two states, 0 or 1. The flow chart of FIGURE 2 may also be realized in apparatus using higher-order coded systems such as tertiary or quaternary, in which more than two paths are available from each node. However, the principles of the decoding procedure are better illustrated with a binary input and the extension to higher order systems is apparent to those skilled in the art.

Figure 4A:
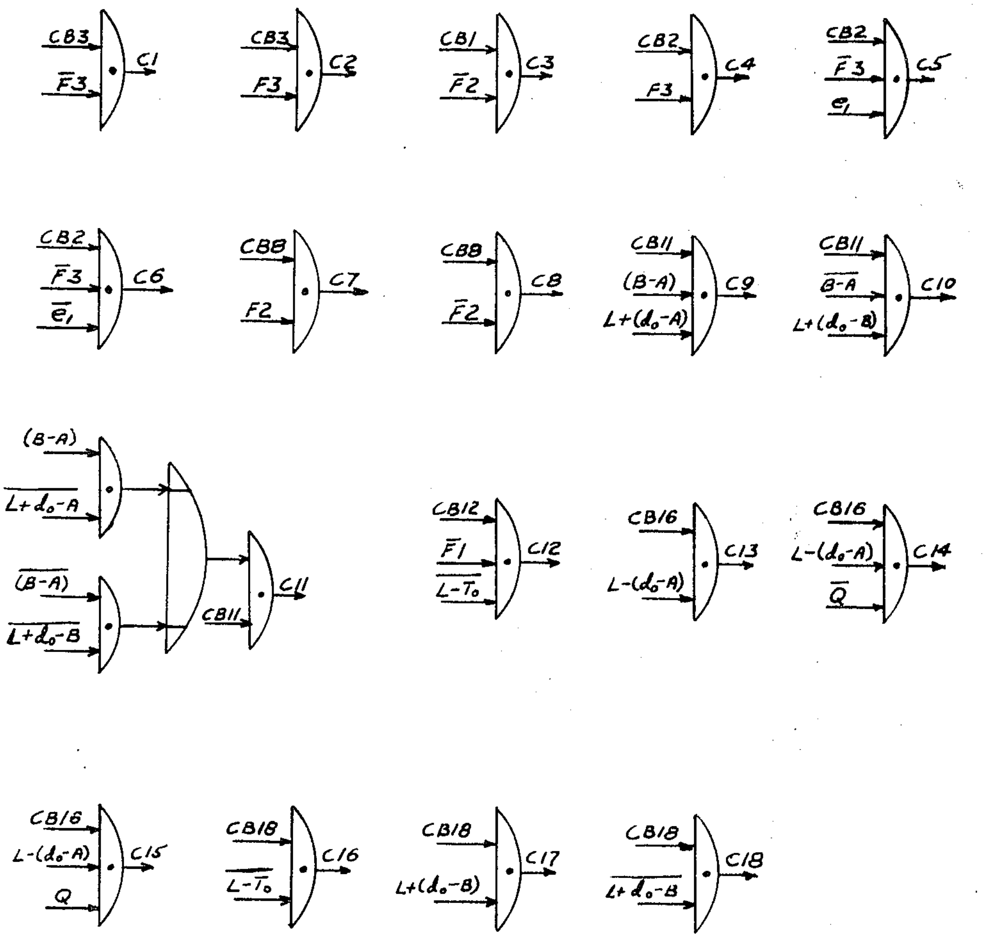
FIGURE 4A shows the logical circuits used to obtain control signals used in FIGURE 4.

FIGURE 4 shows the main elements of a binary decoder in block diagram form. Most of the elements are provided with gating pulses CB*i*, CB*i'* or C*i*. It is assumed that a block shown receiving a gating pulse contains a gate as an integral part of the block. There will be situations where the gated element is not supposed to deliver an output or perform a function until the termination of its gating pulse. In such a situation it is assumed that the gated element is put in a "ready" condition by the gate pulse and triggered by the next clock pulse from clock pulse generator 436. Therefore, all such elements are assumed to have clock pulse inputs which are not shown on the figure. The description of the operation of this decoder will designate such "delayed" outputs by enclosing the function with brackets [ ]. The CB*i* gating pulses are obtained from the output of corresponding B*i* flip-flops in the B register 412. The C*i* gating pulses are obtained by logical "and" and "or" circuits whose equations are given later in this specification. These "and" and "or" circuits are shown in FIG. 4A and they are completely specified by the equations. Each term of the equations are available from the output of one of the operational units of FIGURE 4. The gating pulse identified as CB*i'* signifies that the unit to which it is applied begins to perform its function immediately upon application of the CB*i'* gating pulse and may continue to be operating for the period of time required to complete the function which may be longer than the gating pulse CB*i'* applied to it. The read and write core memory cycles illustrate such a situation where the cycle takes a little over two CB*i* time intervals.

A brief description of the decoder elements or units is given below. Their interconnection to provide an operating decoder is provided by the connections shown in FIGURE 4 and by the gating pulses connected between units.

Receiver 407 receives binary sequentially coded information and causes information pulses $I_0$ and parity pulses $I_1$ to be placed in data input register 408. These pulses are gated out of the register 408 through in-out gates 409 into the MR register 410 of the magnetic core memory 409. The in-out gates 409 are conventional gates connected to cause information to be gated into or out of the MR register 410 in response to selected gating signals. The magnetic core memory 409 has a core storage unit 428 which will have the information contained in the MR register 410 transferred to a desired word position as determined by the word address in the memory address register 414 when "write" unit 426 is gated into operation. Similarly gating on the "read" unit 401 will cause the information in the memory 428 at the address in register 414 to be transferred to the MR register 410. The address in register 414 is determined by gating the address of either the $N_5$ register 411 or the $N_3$ register 422 through gates 413 and 427, respectively, to address register 414.

The address in the $N_5$ register 411 is increased to the next higher address by energizing gate 424 to allow the $N_5+1$ output of the summing circuit to be put back into register 411. Similarly, the address in the $N_3$ register 422 is increased by 1 by gate 431 and summing circuit 432, and decreased by 1 by gate 433 and summing circuit 434. The $N_5$ register determines the memory address into which new information in the data input register will be put. The $N_3$ register contains the address of the word which is then being decoded.

In the decoding mode of operation, the $I_0$ and $I_1$ digits at the memory word address to be decoded is read out to the MR register 410 from which they are gated out to the sum modulo two adder 418 generator 406 is gated to provide a random bit to the $M_0$ storage element 404 of the M register 405. The M register 405 may be a 60 stage shift register of the flip-flop type where gating pulses shift it right or left as desired. In the case where a random bit is to be put in flip-flop 404, the register 405 is previously shifted right by a pulse applied to "shift right" terminal 450. When there has been a failure in decoding, the register is shifted to the left by pulsing terminal 451. In addition, a gate pulse is applied to flip-flop M59 to gate a zero into it so that the M59 digit of the next word may be transferred into the M59 flip-flop of the M register 405.

Parity network 417 generates a "partial" parity bit G1*a* by taking the sum modulo two of $M_0$ and other selected flip-flops of the M register 405. G1*a* is combined with M59 in sum modulo two unit 419 to provide the "final" parity bit G1. the Hamming distances A and B are calculated in the sum modulo two unit 418 and binary adder 420. If the complement of $M_0$ gives a smaller Hamming distance gate 435 is pulsed to change the value in $M_0$ flip-flop 404 to its complement. The $M_0$ flip-flop is the first stage of the M register and the M59 flip-flop is the last stage of the 60 stage M register.

The quantities $d_0$ and T are fixed values chosen to produce a minimum number of computations for successful decoding. All the inputs to summing circuits 437, 438, 439, 440 and 441 are available and may be transferred to the L register 421 by appropriate gating of gates 442, 443, 444, 445 and 446.

The B register 412 contains flip-flops B0 through B18. Each flip-flop B*i* is gated by one or more gating signals and itself provides an output CB*i* which may in turn be a gating signal either acting alone or logically "anded" with other signals such as the outputs of the F flip-flops or the polarities of $(B-A)$, $L+(d-A)$ etc. Each flip-flop B*i* is high for one clock pulse period beginning with the clock pulse received after its input gating pulse CB*i* or C*i* has terminated. Additionally, only one flip-flop B*i* is high at any time.

The F register 402 contains three flip-flops $F_1$, $F_2$, and $F_3$ whose states, 1 or 0, determine the operating modes of the decoder. If $F_1=0$, the threshold can be raised; whereas if $F_1=1$, the threshold cannot be raised. The state of $F_2$ is determined by whether the decoder is going in a forward or a backward direction. If going forward $F_2=0$, if backward $F_2=1$. The state of $F_2$ determines the decoding path in the computer to perform the different operations required. The state of $F_3$ is 1 when there is new information in the date input register 408 waiting to be put into the memory 409. In this case, decoding stops until the information goes into the memory after which time $F_3=0$. The states of the F flip-flops 402 are controlled by gating pulses, and their outputs in turn are used as gating pulses either acting alone or in conjunction with other variables.

Summing circuit 447 provides the polarity of $(B-A)$ which is used as an input to logical circuits shown in FIG. 4A which in turn provide gating pulses C9, C10 and C11.

Digital comparator 430 provides an output $e_1=1$ or "high" when $N_3=N_5$. A simple digital subtraction circuit arranged to give a high output when the difference of $N_3$ and $N_5$ is 0 will suffice. An "and" circuit 429 will provide an overflow alarm when gated as shown in FIGURE 4. The Q flip-flop 416 provides a short term memory for the path number being decoded at a particular word address.

Finally, the decoded data output M59 is made available to a user at data output unit 415 when read out of the memory.

The operation of the decoder of FIGURE 4 will be described by considering each function that occurs during the time that one of the flip-flops B*i* of the B register 412 is in the 1 or "high" state. The order in which these flip-flops B*i* are considered may be readily seen by referring to the simplified decoder flow diagram of FIGURE 5. Each flip-flop B*i* is considered to have contained within it a gating circuit which causes it to assume the 1 state on the next clock pulse following the time that its input gating pulse becomes a 1. As an example, assume that flip-flop $B_0$ becomes a 1 at a given clock pulse, its output $CB_0$ becomes 1 at that time also. $CB_0$ is shown on FIGURE 4 as going to a number of places including the input of flip-flop B3 which is normally in the zero state. B3 will change to the 1 state when the next clock pulse after the "given" clock pulse occurs. $B_0$ will assume the 0 state at that time.

The operation of the decoder of FIGURE 4 can be given in terms of the states of the flip-flops B*i*, because at any given time there is only one of the flip-flops B*i* in the 1 state, and the next step in the decoding procedure is controlled by the flip-flop B*i* to which the output CB*i* of flip-flop B*i* is connected.

In starting the decoding operation description, it will be assumed that with the decoder ready to start decoding flip-flop $B_0$ is in the 1 state and has been in this state for a time considerably longer than one microsecond. This is the only flip-flop which is allowed to stay on for more than one microsecond without receiving another clock pulse at its input. During the time that $B_0=1$ a number of operations occur in the decoder in response to the output pulse $CB_0$ from flip-flop $B_0$ namely:

Clear the memory, all registers and flip-flops

[$1\rightarrow N_5$ register]
[$1\rightarrow N_3$ register]
[$1\rightarrow B_3$ flip-flop]

The "clear" function puts a zero into all the elements which store information. The function begins immediately after a unit receives the high output pulse of flip-flop $B_0=1$. Since this particular function begins immediately after $B_0=1$, the units in which this function occurs are shown as receiving an input $CB'_0$, the prime indicating that the leading edge of $CB_0=1$ causes the unit to start performing the function. As an example, the core storage unit 428 is shown on FIGURE 4 as receiving a $CB'_0$ pulse which means that as soon as the pulse $CB_0=1$, the core storage is to start "clearing" all its storage elements. Those units of FIGURE 4 to which an unprimed gating pulse CB*i* is applied begin performing their functions on the next clock pulse after $CBi=1$, which in effect causes the function to be performed one clock pulse period after $CBi=1$.

The brackets [ ] surrounding the function $1\rightarrow N_5$ register, means that the function is a delayed function as described above and all units which are involved in performing this function are pulsed by unprimed gating pulses CB*i*, in this case $CB_0$. The function $1\rightarrow N_5$ means that a 1 is put into the $N_5$ register 411 by a gate pulse $CB_0$ connected to gate 424. The number in the $N_5$ register controls the word address of core memory 409 into which new incoming data is to be put after the old information at that address is read out. This old information will contain the decoded digit which is supplied as the output. The function $1\rightarrow N_3$ means that a 1 is put in the $N_3$ register 422 by gate pulse CB0. The $N_3$ register contents determines the address in the memory 409 at which the decoding operation is taking place. The function $1\rightarrow B3$ indicates that the flip-flop B3 will become 1 when flip-flop $B_0$ becomes 0.

The time interval $B3=1$ occurs immediately after flip-oop $B_0$ becomes 0. During time interval B3, flip-flop B3 is high, or $B3=1$. The function which will occur because $B3=1$ is controlled by the state of flip-flop F3. If $F3=0$, which is its state when there is no information in the data input register 408, flip-flop B3 will have its output gated to its own input and thus recirculates the $B3=1$ condition until F3 becomes a 1. Thus flip-flop B3 has an input gating pulse $C1=CB3\cdot\bar{F}3$ which causes it to recirculate. The circuitry for providing the gating pulses C*i* is not shown on FIGURE 4 since the circuitry is obvious once the logic desired, in this case $CB3\cdot\bar{F}3$, is given. Alternately, when $F3=1$, a gating pulse $$C2=CB3\cdot F2$$

shown going to flip-flop B4 will cause B4 to become 1.

When B4 changes its state to $B4=1$, it immediately causes the initiation of the read cycle at address $N_5$ in memory 409. This is accomplished by $CB4'=1$ gating the word address stored in register $N_5$ (in this case the word address is the first word in the memory 409 since $1\rightarrow N_5$ register occurred at the end of $B_0$) into the memory word address register 414, and $CB4'=1$ triggering the read unit 401 of the memory 409. The read cycle is assumed to require slightly more than two microseconds and will not be able to provide the contents of word position in $N_5$ in MR register 410 through gate 4091 initiated by gating signal CB4' until time interval B6. At the end of B4, B5 is caused to become a 1 for one microsecond to provide a delay, after which $B6=1$.

Shortly after $B6=1$, the information becomes available in the MR register 410 and the M59 bit in the MR register is then gated out by CB6 to the data output flip-flop 415. The read-out operation has destroyed the information content of the memory at word position $N_5$ which prepares the memory word position $N_5$ for the new information which is contained in the data input register 408, as indicated by $F3=1$.

Initially, there is no need to read-out a word position in the memory since the memory was cleared during the $B_0$ time. However, the memory contains only 1000 words and 1001th word in the data input register must be placed in the first word position in the memory. Before this can be done, the old information in word position one must be cleared out, and this is done by the read-out process just described.

The significance of reading out the M59 data bit in the $N_5$ word position is that the M59 bit is the decoded bit which the machine has decided corresponds to the bit that was originally transmitted 1000 words earlier. Thus, the M59 bit will be zero until the 1001 word is ready to be stored in the memory 409 at which time a positive or a zero bit will be retrieved from word position one. The polarity of this decoded bit M59 is assumed to be the polarity that was originally transmitted regardless of the polarity of the received information bit $I_0$. M59 is made available to a user at data output flip-flop 415.

The termination of $B6=1$ causes B7 to become 1. The rise of B7 initiates the memory write cycle at address $N_5$ and writes the information bit $I_0$ and parity bit $I_1$ in the digit input register 408 through in-out gate 409 by gating signal CB7′ into the MR register 410 from which point the memory write cycle will cause it to be stored in the memory 409 at address $N_5$ through the $I_0$ and $I_1$ portions of gates 4091 by gating signal CB7′.

At the termination of B7, F3 is changed to $F3=0$ because the information is no longer contained in data input register 408. The $N_5$ register 411 is caused to be increased by 1 by gate 412 gated on by $CB7=1$ so that the next data written into memory 409 will be at the next greater address. $B_1$ is caused to become $B_1=1$ when $B7=1$ terminates.

During the time interval when $B_1=1$, the state of F2 must be considered. If the decoder is attempting to go forward, $F2=0$ and the logic will cause B2 to go high when $B_1$ terminates. However, if the decoder has failed and is going backward, $F2=1$, and it is necessary to check the operating address $N_3$ against the address $N_5$ of the incoming information. If they are equal, there is an "overflow" condition since when shifting left, the decoder is supposed to be operating on old information, not new information. In the event of an overflow, the decoding stops and must be re-initiated. If the operating address $N_3$ is different from the incoming information address $N_5$ when going backward, $F2=0$, the decoder will be operating on old information, and $B2=1$ at the end of the B1 time.

The memory write cycle is completed during the $B2=1$ time and the decoder is ready at the end of B2 to decode information from the data input register 408. In practice the incoming information is coming in to the decoder at a much slower rate than the time required for performing decoding operations and there will not be new information in register 408 immediately after reading in such information to the memory.

During the $B2=1$ time, the flip-flop $F3=1$ determines that data input register 408 information is available to be put into the memory, and B4 is set to 1 at the termination of the B2 time if such is the case. If $F3=0$, there is no new information in register 408 and decoding is possible. However, before decoding it is again necessary to determine the relationship of the operating address $N_5$ to the new information address $N_3$. If they are equal, $e_1=1$, the decoding has caught up with the incoming information data and it is necessary to go into the waiting mode by causing $B3=1$ at the end of the B2 time. The waiting mode of B3 has been previously described. However, if the decoding is at address $N_3$ less than address $N_5$, $e_1=0$ and $B8=1$ will occur at the end of the B2 time. This means that there are words presently available for decoding, that there is no information in register 408, and a decoding operation should occur next.

At the beginning of the B8 times, the memory read cycle at address $N_3$ is initiated, through gates 4091 by gating signal CB8′. If the flip-flop $F2=0$ an attempt to go forward in the decoding process is attempted. A random bit from generator 406 is put into the $M_0$ flip-flop 404 of the M register 405. Also $B9=1$ at the end of B8. If instead $F2=1$, the decoder would be attempting to go backwards or retrace, this condition will be considered later.

During time B9, as part of the process of attempting to proceed or go forward in the decoding, "partial" parity bit G1*a* is computed by the same circuitry except in one respect as that of the transmitter and receiver for obtaining parity bits is used. The only difference is that parity network 417 does not use the M59 digit in calculating the "partial" parity bit G1*a*. The reason for calculating G1*a* is that during B9 time, the M59 digit is being retrieved from memory 409 and is not available in the M register 405 until the B10 time. Since calculation of the parity bit G1*a* takes a considerable fraction of the B9 time, the calculation is performed during B9 time in order that only one parity bit calculation consisting of the sum modulo two of G1*a* and M59 need be performed during B10 time. $B10=1$ at the end of the B9 time.

Shortly after $B10=1$ time begins, the information stored in the $N_3$ address is available from memory 428 in the MR register 410. The $CB10=1$ control signal applied to gate 409 is used to gate M59 in the MR register ($Mr$(M59)) into the M59 digit position of the M register 405, to gate MR($I_0$) and MR($I_1$) into the sum modulo two circuit 418, and also to gate the MR(Q) digit into the Q storage flip-flop 416.

The parity bit G1 is obtained from sum modulo two unit 419 whose inputs are G1*a* and M59. Knowing $M_0$, G1, that complement $\overline{M}_0$ and $\overline{G1}$ are easily obtained at the same time. The Hamming distance is computed for the random information bit $M_0$ and the computed parity bit G1 and the received information bit $I_0$ and the received parity bit $I_1$. This distance is called A. Similarly, the Hamming distance of $\overline{M}_0$, $\overline{G1}$ and $I_0$, $I_1$ is computed and called B. The Hamming distance is calculated by using the sum modulo two adder 418 to get $M_0 \oplus I_0$, $G1 \oplus I_1$, $\overline{M}_0 \oplus I_0$, and $G1 \oplus I_1$, outputs. The binary adder 420 calculates the binary sum of $M_0 \oplus I_0$ and $G_1 \oplus I_1$ to get A and $\overline{M}_0 \oplus I_0$ and $\overline{G}_1 \oplus I_1$ to get B. The sign of $(B-A)$ is also computed in unit 447 during the B10 time. $B11=1$ occurs at the end of the B10 time.

If the sign of $(B-A)$ is positive, the Hamming distance generated by $M_0$ is smaller than that generated by $\overline{M}_0$. Therefore, the $M_0$ digit 404 already in the M register 405 is left there and tentatively assumed to be the correct polarity of the transmitted information digit until subsequent decoding failure should require it to be changed. Since $M_0$ is the most likely hypothesis for $I_0$, the sign of $L+(d_0-A)$ is computed to determine whether the best path terminates in an amplitude $L+(d_0-A)$ exceeding the threshold which for the decoder being described is zero.

Previously, the explanation of the decoder assumed that the value of L and the threshold T continue to increase ever greater in amplitude as successful decoding takes place. In practice such a decoder would be impractical but the same end result is achieved in a practical decoder by subtracting $T_0$ from L each time L exceeds $T_0$. Thus, if $L+(d_0-A)$ is positive, it is a success since it exceeds the threshold which is at the zero level. If the sign of $L+(d_0-A)$ is positive, the value $L+(d_0-A)$ is gated by C9 to replace the value L previously stored in the L register 421 at the termination of the B11 time. From time $B12=1$ the new value in the L register 421 will be designated as L. $B12=1$ occurs at the end of the B11 time.

On the other hand if the sign $(B-A)$ is negative, $\overline{M}_0$ is the most likely hypotheses for the transmitted information digit. The sign of $L+(d_0-B)$ is computed and a success occurs if the sign is positive. The value $M_0$ is tentatively chosen and the random bit $M_0$ in the M register 410 is replaced by its complement $\overline{M}_0$. The value $L+(d-B)$is calculated and placed in the L register 421 at the conclusion of the B11 time.

If during the B11 time there has been a success in going forward in the decoding process, $B12=1$ will occur at the end of the B11 time. At $B12=1$, a write cycle into the memory 428 at address $N_3$ through gates 4091 by gating signal CB12′ will be initiated. This is the same address as that which was read out beginning at time B8. The value of $I_0$ and $I_1$ in the MR register 410 is replaced in the memory at address $N_3$ as are the value of M59 obtained from the M register 405 through gate 409 and the value of Q obtained from the Q flip-flop 416 through gate 409. The Q flip-flop contains the information as to the number of paths which have been tried. Q corresponds to $i(n)$ in FIGURE 3. When Q is 0, this means that only one path from a node has been tried. If Q is 1, both paths from the node have been tried and if there is a failure for both paths it is necessary to go back one word position in which event Q becomes 0 for the word position at which both attempts to go forward failed.

In addition, to writing into the memory the magnitude of the value of L that was stored in the L register at the end of B11 is examined to determine whether the threshold can be increased in effect, by $T_0$ by the process of subtracting $T_0$ from L and observing the sign of $(L-T_0)$. If the sign is positive and if flip-flop $F1=0$ (allowing the threshold to rise), the value of $(L-T_0)$ is placed in the L register 421 at the termination of B12. If the sign of $(L-T_0)$ is negative of if $F1=1$, the value of L in the L register 421 is left unchanged at the termination of B12 so that the threshold remains unchanged even though there has been a success in the decoding procedure.

Also at the end of the B12 time, the M register is shifted one place to the right, $M_{i+1}M_i$, so that the M register will be ready to receive another random bit in the $M_o$ digit 404. The decoding success in B11 allows the operating address to be increased by 1 as represented by $N_3+1 \rightarrow N_3$. A zero is put into the F2 flip-flop since a decoding success is followed by a forward path in the decoding procedure. Finally, at the end of the B12 time, $B1=1$ and a point has been reached which has been discussed earlier.

Returning to the B11 time, the case where the sign of $[L+(D_o-B)]$ or the sign of $[L+(d_o-B)]$ was positive has already been discussed. If the sign of each is negative both $M_o$ and $\overline{M}_o$ fail as tentative bits for flip-flop 404 of the M register 405. Thus there is a failure in the decoder's attempt to go forward from operating word position $N_3$. The M register will be shifted left in order to make room in the M59 position for the value of M59 from the memory at word position $N_3-1$. The M59 position is caused to be zero. At the end of the B11 time, $B13=1$.

At the beginning of the B13 time, the write cycle of the memory is initiated at address $N_3$ thereby restoring the $MR(I_0)$ $MR(I_1)$ MR(Q) and MR(M59) into the memory from whence they came through gates YO91 by gating signal CB13'. The value of Q is zero for the case where B11 preceded B13 since the decoding path for this sequence is forward. The value of M59 is caused to be zero because this puts Q and M59 in their initial starting conditions so that when this word position $N_3$ is arrived at later on in the decoding process, the word position $N_3$ will appear as if it had never been processed before. At the end of B13 the operating address register $N_3$ 422 is decreased by one word position to $N_3-1$. The F1 and F2 flip-flops are put into the one state signifying that there has been a failure and that the threshold is not to be increased and that the decoding is going backward, respectively. Also at the end of the B13 time, $B1=1$.

The subsequent steps in the decoding procedure are those occurring during the B1 and B2 times in succession. Since $F1=1$ and $F2=1$ are the conditions imposed by the operations during the B13 time, the operations during the B1 and B2 times will be subject to these constraints. Also it will be assumed that there is no new information in data input register 408 waiting to be put into the memory 409 so that the additional constraint is $F3=0$. For these F1, F2 and F3 states, reference to the previous explanation of operations during B1 and B2 times will indicate that the next sequence of operations will take place during time interval B8.

The operations occurring during the B8 time for the condition $F2=0$ has previously been considered. It was seen that no mater what the state of F1, the beginning of B8 initiates a memory read cycle at address $N_3$ (this is actually one word position below the word position of the $N_3$ address at which failure occurred). However, since the decoder is in a backward mode of search operation, $F2=1$, and the only other function performed during the B8 time (for $F2=1$) is to cause B14$a$ to go high at the termination of B8 thereby providing one microsecond of waiting time while the information stored at word address $N_3$ is being retrieved.

The only function of B14 is to provide another one microsecond waiting time at the end of which B15 is cause to become high, $B15=1$.

Shortly after B15 goes high, the information stored in the memory 409 becomes available in the MR register 410. For reasons given earlier in the explanation of operations during time interval B9, a partial parity bit G1$a$ is computed in parity network 417 during the B15 time by using the information $M_0$ to M58 already stored in the M register 405. At the end of the B15 time, the M59 and Q information in the MR register 410 is gated through gate 409 into the M59 position of the M register and to the Q flip-flop 416, respectively. At the end of the B16 time, B16 becomes high.

As soon as B16 goes high, the parity bit computation is completed in sum modulo two adder 419 to provide G1. Since $I_0$ and $I_1$ from position $N_3$ are available in the MR register they are gated through gate 409 into sum modulo two adder 418 as are $M_0$ and G1. The quantities A and B are calculated in binary adder 420. However, only A is used during the B16 time. It should be recalled that the value of $M_0$ in the M register 405 is the value which was used in calculating either $(d_0-A)$ or $(d_0-B)$ when the decoder was in the forward decoding mode. The choice of $M_0$ was determined by whichever was more positive. Now that the decoder is in a backward mode of operation the sign of $L-(d_0-A)$ must be calculated before the next steps in the decoding process can be determined.

If the sign is negative, this signifies that in going backward to the previous operating word address the amplitude of $L-(d_0-A)$ has dropped below the threshold. Therefore, in the forward mode of operation $L+(d_0-A)$ must have exceeded the threshold then existing at L by $T_0$. This condition is dealt with when B17 goes high at the end of B16.

When B17 becomes high, a write cycle at address $N_3$ is initiated and $MR(I_0)$, $MR(I_1)$, Q and M59 are put into the memory 428 through gates 4091 by initiating gating signal CB17'. B17 has been caused to become high because $L-(d_0-A)$ has fallen below the threshold. It is, therefore, desired to go forward from the operating word position $N_3$ at a threshold reduced by $T_0$. This is effectively accomplished by adding $T_0$ to the value of L at the end of the B17 time. Although $F1=1$ during the B17 time, the prohibition of threshold changes is that the threshold cannot increase when $F1=1$, here the threshold is being decreased. Also at the end of the B17 time, the operating word address is increased by one to the position at which the failure occurred and B1 is made high. Flip-flop F2 is made high at the end of B17 since the decoding is to be attempted in a forward direction. When B1 is high the decoding procedure proceeds are described previously. The effect of the negative sign of $L-(d_0-A)$ is that the decoder is directed to lower the threshold and then try to proceed forward on the path that previously failed but with a new lower threshold.

It was earlier assumed that when B16 was high, the sign of $L-(d_0-A)$ was negative and the significance of this sign and the subsequent decoding steps were given. If instead the sign of $L-(d_0-A)$ is positive the previous forward path did not cause the threshold to rise and no change in threshold is required. The magnitude of $L-(d_0-A)$ is transferred into the L register at the end of B16. This last step subtracts the contribution $\lambda=(d_0-A)$ which was originally made in going forward in the decoding process and thus gives the correct amplitude of L for the address at which the decoder is operating. Expressed another way, the distance contributed by $M_0$ in the M register is being subtracted so that the alternate path that uses $\overline{M}_0$ may subsequently be examined.

When the sign of $L-(d-A)$ is positive during $B16=1$, alternative paths in a forward direction are to be examined. The decoder always initially selects the best path on the first try going forward from a given address. This best path is assigned the value $Q=0$ and is stored in the Q digit of the word position in the memory 409. If $Q=0$ during time B16, the decoding procedure is directed to B18 at the end of B16 where the alternate path is examined. There are only two paths from each node in the decoder being described. If $Q=1$, this signifies that the alternate path has already been tried, so that both paths have been tried and the decoder must go back to the previous word position.

If it is assumed that $Q=1$ and hence that both paths from the operating address $N_3$ have been tried, several processes occur at the termination of the time B16. The M register is shifted back one place and a zero is put into the M59 position of the M register 410. A zero is put into the Q position of the MR register 410 so that the word information at the operating address $N_3$ will look as if it has never been examined before at some subsequent time in the decoding procedure. A 1 is placed in B13 which has already been discussed and will be recalled that among other things initiates the writing in memory at address $N_3$ the information contained in the MR register 410. Also, B13 will cause the $N_3$ address to be reduced by 1 to $N_3-1$ so that the decoder will attempt to go forward again at the earlier word address $N_3-1$.

Instead, if it is assumed that $Q=0$, when the sign of $L-(d_0-A)$ is positive, the termination of B16 will cause B18 to become high during which time the alternate path in the forward direction will be examined. During the B18 time, it is determined whether the sign of the new $L-T_0$ is positive or negative. If the sign is negative, this means that the alternate path is a new path and the threshold can be raised if it exceeds the present threshold by $T_0$. The flip-flop F1 becomes 0 to allow the threshold to rise. If the sign of $L-T_0$ is positive, the threshold is not allowed to raise when going forward and F1 is retained in its 1 state. Simultaneously, $\overline{G}1$ and B are being computed to provide the new value of the alternate path termination $L+(d_0-B)$. The sign of $L+(d_0-B)$ is calculated. If it is positive at the termination of the B18 time, the value $L+(d_0-B)$ is put in the L register where it is used for subsequent calculations, the complement $\overline{M}_0$ of the $M_0$ bit in the M59 is placed in M59, Q is increased to 1 to indicate that both paths have been used and B12 is caused to assume the one state. The decoding processes which take place in B12 have been previously explained.

The situation where $L+(d_0-B)$ is positive during the B18 time has just been examined. If $L+(d_0-B)$ is negative, this means that there has been a failure in attempting to go forward on the alternate path. Therefore, at the end of the B18 time, the M register is shifted left, a 0 is put in the M59 position of the M and MR registers, a zero is put into Q in the MR register, and B13 assumes the one state. As has already been explained in the discussion of occurrences during the B13 time, the information stored in the MR register is read into the memory 428 and the decoding processes are established to begin decoding at the next earlier address $N_3-1$.

The preceding explanation of FIGURE 4 has described a decoder which operates in a particular way to execute the decoding algorithm of this invention. Other decoder equipment configurations are available to the skilled designer attempting to mechanize the logic flow diagram of FIGURE 2.

The explanation of FIGURE 4 attempts to point out the significance of the steps in the decoding procedure. In order to more clearly present the operations which occur during each elementary time $B_i$ in the decoding process, the following list of $B_i$'s will present the operations which occur during and immediately after the time interval without any explanatory material. In addition to the functional statement of what occurs during a $B_i$ time interval, immediately below the function will be the logic required to produce the gating signals which will cause that function to be performed by the operational blocks to which the gating signals are directed.

Time Interval
↓ Function
↓ Gating Pulse
↓

$B0=1$
Clear memory, registers and flip-flops.
CB0′
$[1\rightarrow N_5]$
$[1\rightarrow N_3]$
$[1\rightarrow B3]$
CB0

$B3=1$
$[1\rightarrow B3]$
$C1=CB3\cdot\overline{F}3$
$[1\rightarrow B4]$
$C2=CB3\cdot F3$ $B4=1$
Initiate memory read cycle at address $N_5$.
CB4′
$[1\rightarrow B5]$
CB4

$B5=1$
$[1\rightarrow B6]$
CB5

$B6=1$
(Memory read cycle begun at $B4=1$ is completed during this time interval and is available in the MR register).
$[MR(M59)\rightarrow$D.O. Register 415]
$[1\rightarrow B7]$
CB6

$B7=1$
Initiate Memory Write Cycle at address $N_5$.
Gate Data Input Register 408 into MR Register 410.
CB7′
$[0\rightarrow F3]$
$[N_5+1\rightarrow N_5]$
$[1\rightarrow B1]$
CB7

$B1=1$
Compare address $N_3$ and $N_5$ to detect overflow.
overflow$=CB1\cdot e_1\cdot F2$
$[1\rightarrow B2]$
$C3=CB1\cdot\overline{F}2$ $B2=1$
$[1\rightarrow B4]$
$C4=CB2\cdot F3$
$[1\rightarrow B3]$
$C5=CB2\cdot\overline{F}3e_1$
$[1\rightarrow B8]$
$C6=CB2\cdot\overline{F}3\cdot\overline{e}_1$ $B8=1$
Initiate Memory Read Cycle at Address $N_3$.
Put a Random Bit into $M_0$.
CB8′
$[1\rightarrow B14]$
$C7=CB8\cdot F2$
$[1\rightarrow B9]$
$C8=CB8\cdot\overline{F}2$ $B9=1$
Generate Parity Bits G1*a*
(no control required since they can be continuously generated).
$[1 \rightarrow B10]$
CB9

$B10=1$
Compute parity bits G1, $\overline{G}1$;
Compute Hamming distance A.
Compute Hamming distance B.
Compute the sign of $B-A$
No gating required, continuous operation possible.
$[MR(Q) \rightarrow Q]$
$[MR(M59) \rightarrow M\ REG\ M(59)]$
$[MR(I_0) \rightarrow \oplus I_0]$
$[MR(I_1) \rightarrow \oplus I_1]$
$[1 \rightarrow B11]$
CB10

$B11=1$
Compute sign of $(B-A)$
Compute sign of $L+(d_0-A)$
Compute sign of $L+(d_0-B)$
No gating required, continuous.
$[L+(d_0-A) \rightarrow L]$
$[1 \rightarrow B12]$
$C9=CB11 \cdot (B-A) \cdot [L+(d_0-A)]$
$[L+(d_0-B) \rightarrow L]$
$[\overline{M} \rightarrow M_0]$
$[1 \rightarrow B12]$
$C10=CB11 \cdot \overline{(B-A)} \cdot [L+d_0-B)]$
$[M_1-1 \rightarrow M_1]$
$[0 \rightarrow M59]$
$[1 \rightarrow B13]$
$C11=CB11\{(B-A) \cdot \overline{[L+(d_0-A)]} + \overline{(B-A)} \cdot \overline{[L+(d_0-B)]}\}$ $B12=1$
Initiate Write cycle at address $N_3$ and put $MR(I_0)$, $MR(I_1)$, Q and M59 into the memory at this address.
CB12′
$[M_1+1 \rightarrow M_1]$
$[N_3+1 \rightarrow N_3]$
$[0 \rightarrow F2]$
$[1 \rightarrow B1]$
CB12
$[L-T_0 \rightarrow L]$
$C12=CB12 \cdot \overline{F}1 \cdot \overline{(L-T_0)}$ $B13=1$
Initiate Write cycle at address $N_3$ and put $MR(I_0)$, $MR(I_1)$, Q and M59 into the memory at this address.
CB13′
$[N_3-1 \rightarrow N_3]$
$[1 \rightarrow F1]$
$[1 \rightarrow F2]$
$[1 \rightarrow B1]$
CB13

$B14=1$
$[1 \rightarrow B15]$
$CB14$ $B15=1$
Parity bit G1*a* available during this time period no no gates necessary
$[MR(Q) \rightarrow Q]$
$[MR(M59) \rightarrow M59]$
$[1 \rightarrow B16]$
CB15

$B16=1$
Compute G1, A, sign of $L-(d_0-A)$
no gates necessary
$[1 \rightarrow B17]$
CB16
$[L-(d_0-A) \rightarrow L]$
$C13=CB16 \cdot [L-(d_0-A)]$
$[1 \rightarrow B18]$
$C14=CB_{16} \cdot [L-(d_0-A)] \cdot \overline{Q}$
$[M_1-1 \rightarrow M_1]$
$[0 \rightarrow M59]$
$[0 \rightarrow Q]$
$[1 \rightarrow B13]$
$C15=CB16 \cdot [L-(d_0-A)] \cdot Q$ $B17=1$
Initiate Write cycle in memory at address $N_3$ and put $MR(I_0)$,
$MR(I_1)$, Q and M59 into memory at this address.
CB17′
$MR(I_1)$, Q and M59 into memory at this adress.
CB17′
$[N_3+1 \rightarrow N_3]$
$[0 \rightarrow F2]$
$[L+T_0 \rightarrow L]$
$[1 \rightarrow B1]$
CB17

Figure 5:
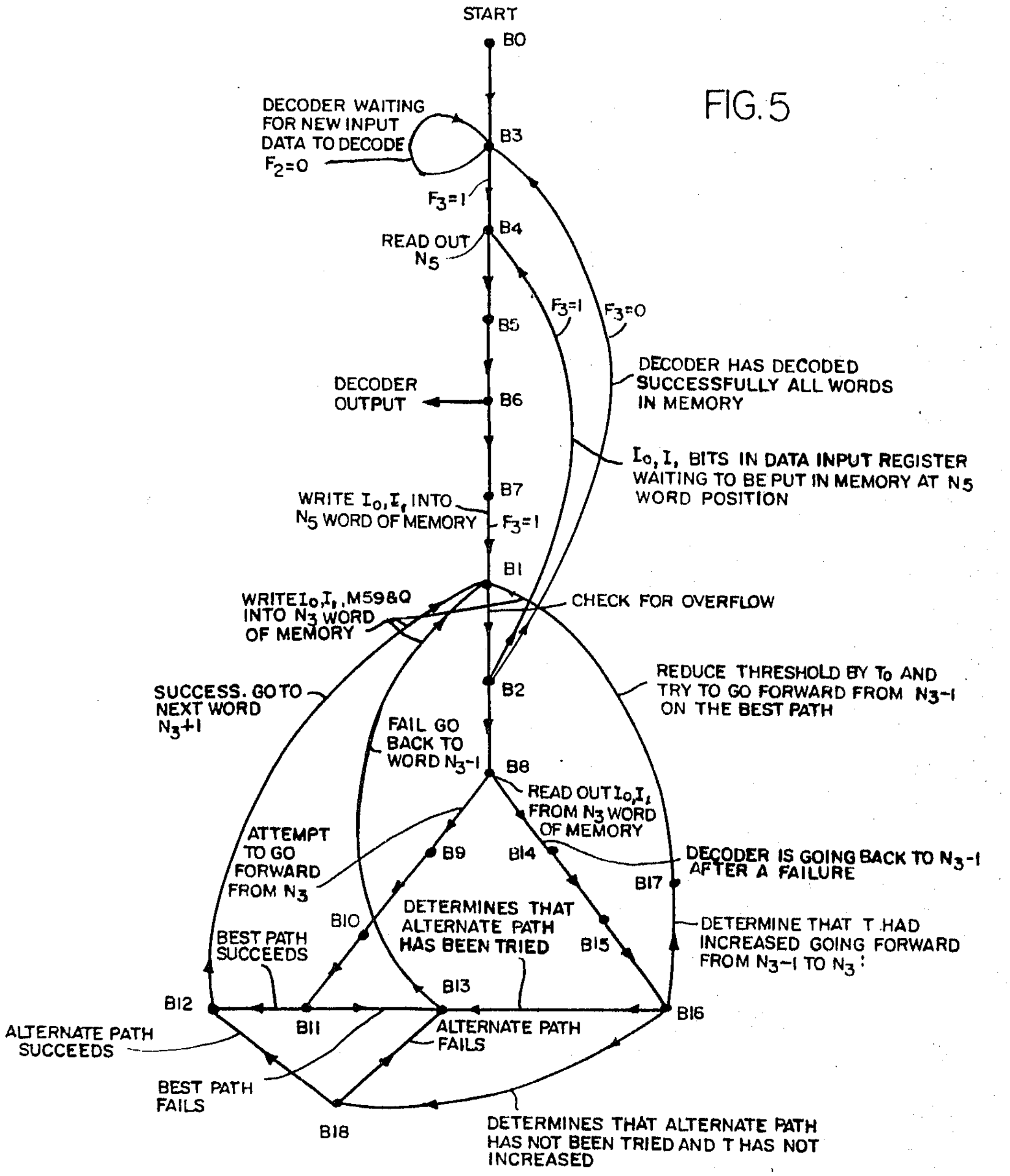
FIGURE 5 is a simplified decoder control flow diagram.

$B18=1$
Compute sign $(L-T_0)$, $\overline{G}1$, B and $L+(d_0-B)$ and its sign. No gates necessary.
$[0 \rightarrow F_1]$
$C16=CB18 \cdot \overline{(L-T_0)}$
$[L+(d_0-B) \rightarrow L]$
$[\overline{M}_0 \rightarrow M_0]$
$[1 \rightarrow Q]$
$[1 \rightarrow B12]$
$C17=CB18 \cdot [L+(d_0-B)]$
$[M_1-1 \rightarrow M_1]$
$[0 \rightarrow M59]$
$[0 \rightarrow Q]$
$[1 \rightarrow B13]$
$C18=CB18 \cdot \overline{[L+(d_0-B)]}$ FIGURE 5 is simplified decoder control flow diagram. Each node on the diagram represents the beginning of the time period B*i* corresponding to the node designation B*i*. FIGURE 5 attempts to provide a unified picture of the function which the decoder performs during a given time interval B*i* or a group of time intervals. For instance, during time interval B11 the decoder determines whether the best path going forward from a node is either a failure or a success. If there has been a failure, FIGURE 5 shows that the decoder has directed that the functions occurring during time interval B13 should be next performed. On the other hand, if the best path had been a success, FIGURE 5 shows that the functions occurring during time interval B12 should be next performed. The detailed functions to be performed during a time interval B are given in the specification immediately preceding this paragraph.

Although the method of decoding of this invention has been described in terms of a specific embodiment using a binary system having one information digit and one parity digit, the invention should not be so limited. For example, there may be more than one information digit and partity digit in a transmitted word. If such is the case, there will be more than two paths from every node but the Hamming distance can still be used as a means for determining the likelihood or probability that a given path (or its corresponding word) is the correct path (or word) if the transmission channel is binary symmetric so that each digit is disturbed independently of the others. Other modulation systems are possible which result in non-binary symmetric channels. In this case, the Hamming distance technique of determining likelihood or probability may not be available and other techniques must be used to determine the likelihod that a particular generated word is the word that was transmitted.

What is claimed is:

1. Apparatus for decoding noise disturbed sequentially encoded binary digital data received in the form of a time sequence of words, each word having one or more information digits and one or more parity digits corresponding to said one or more information digits, comprising means for storing said received information and parity digits, means for generating a plurality of information digits together with their corresponding parity digits to provide a plurality of words, means for selecting a received word in said storage, means for combining said selected received word and each of said plurality of generated words to provide a plurality of quantities related to the differences of said received and generated words, means for selecting the most positive quantity of said plurality of quantities, means for accumulating said selected most positive quantity for each word; means for providing a preselected threshold, a first means for comparing said accumulated quantity with said preselected threshold, means for storing said one or more generated information digits corresponding to said selected most positive quantity when said accumulated quantities are greater than said preselected threshold, the stored generated information digits being the tentative decoded value corresponding to the noise corrupted information digits in said word.

2. The apparatus as in claim 1 which further includes means for rejecting the generated information digits corresponding to the most positive selected quantity when said accumulated quantities have a value less than said preselected threshold, means for selecting and substituting the received word next preceding the first selected word.

3. Apparatus as in claim 2 which further includes means for providing a control function having a binary state output, means for adding a step value to said prescribed threshold to provide a prescribed stepped threshold, means for comparing said accumulated quantity with said incremented threshold, means for causing said control function means to have a zero binary output when said accumulated quantity is less than said stepped threshold and greater than said prescribed threshold, whereby said decoder is determined to be on a path that had never been successfully tried before.

4. Apparatus as in claim 3 which further includes means responsive to said control function means output state to increase said prescribed threshold to a next prescribed threshold when said state is zero, said next prescribed threshold being the original prescribed threshold increased by at least one of said steps, said step increases being terminated when said accumulated quantity is less than said next prescribed threshold plus a step whereby said next prescribed threshold is to be used as the prescribed threshold for the next received word, and means to replace the selected received word with the next succeeding received word when said accumulated quantities are greater than said original prescribed threshold, means to provide that the selected quantity of the next received word is the largest quantity.

5. The apparatus as in claim 4 wherein said control function means provides a binary one output when said accumulated selected quantities are less than said original prescribed threshold, which apparatus further includes means for determining the accumulated values at the preceding word in response to said binary one output, a second means for comparing said preceding accumulated values with said prescribed threshold, means for reducing said prescribed threshold, when said preceding accumulated values are less than said original prescribed threshold, means for providing this reduced threshold to said first comparing means, whereby said accumulated values are compared with said reduced threshold.

6. The apparatus as in claim 5 which further includes a predetermined number of said plurality of quantities, means for determining the number of quantities which have been used at said previous word when the preceding accumulated quantities are greater than or equal to said prescribed threshold, means for comparing said numbers, means for substituting said preceding word accumulated values by the accumulated values of the next preceding word when said numbers are equal, means for adding the most positive remaining quantity to said preceding accumulated quantities, in said first comparing means, when said numbers are unequal, means for causing said control function means to provide a zero output when said accumulated quantities are greater than the original prescribed threshold and less than the original prescribed threshold increased by one step threshold, means for providing said stored information digits as the decoded output.

7. Apparatus for decoding noise disturbed sequentially encoded binary digital data received in the form of a time sequence of words, each word having one or more information digits and one or more parity digits corresponding to said information digits, means for storing said received words, means for selecting any $n^{th}$ word from said storage, means for generating a plurality of words each word having the same number of digits as said received word, means for determining the Hamming distance between said received word and each generated word, means for converting said plurality of Hamming distances into a plurality of quantities $\lambda_{i(n)}$, said quantity $\lambda_{i(n)}$ being a maximum $\lambda_0$ for the word having the minimum Hamming distance, means for selecting the maximum available quantity $\lambda_{i(n)}$ at said $n^{th}$ word, means for storing the sum of the $\lambda_{i(n)}$ of the previous $(n-1)$ words, said sum being a quantity $L_n$, means for summing said selected maximum quantity $\lambda_{i(n)}$ at said $n^{th}$ word with said quantity $L_n$ to provide a quantity $L_{n+1}$, a preselected threshold T, a preselected step $T_0$ in threshold T to provide a preselected stepped threshold $(T+T_0)$, first means for comparing said quantity $L_{n+1}$ with said preselected threshold T, second means for comparing said quantity $L_{n+1}$ with said preselected stepped threshold $(T+T_0)$, means for providing a binary signal F, means for causing said binary signal F to assume a zero state when $T<L_{n+1}<(T+T_0)$, means for storing the values of the one or more information digits of the generated word which corresponds to the value of $\lambda_{i(n)}$ which when added to $L_n$ gives a $L_{n+1}$ greater than or equal to threshold T in said first comparing means, means for causing said selecting means to select the $(n+1)^{th}$ word from storage when $L_{n+1} \geq T$, and means for repacing said $n^{th}$ word in said determining means by said $(n+1)^{th}$ word when $L_{n+1} \geq T$, means for increasing said preselected threshold T by a threshold step $T_0$ to a first new prescribed threshold T when said binary signal F is previously in the zero state and said $L_{n+1} \geq T+T_0$, said increasing means continuing to increase said first new preselected threshold T until $L_{n+1}$ becomes less than $T+T_0$, means for causing said binary signal F to assume a one state when said $L_{n+1}<T$, means for determining the sum of the $\lambda_{i(n)}$ of previous $(n-2)$ words to provide a quantity $L_{n-1}$, means for comparing the amplitude of quantity $L_{n-1}$ with the preselected threshold T, means for reducing said prescribed threshold T by the threshold step $T_0$ to provide a second new prescribed threshold T when $L_{n-1}$ is less than said original prescribed threshold T, means for comparing the number of quantities of $\lambda_{i(n)}$ already tried at word position $n-1$ with the total number of quantities $\lambda_b$ available, said comparison occurring when $L_{n-1}$ is greater than or equal to the original threshold T, means for selecting the $(n-2)^{th}$ word when all paths have been tried from $L_{n-1}$, whereby the value of $L_{n-2}$ is substituted for $L_{n-1}$, means for increasing the value of $\lambda_k$ to $\lambda_{k+1}$ when $L_n$ is greater than or equal to the original threshold T and $\lambda_{i(n)}$ is less than $\lambda_b$, means for comparing the value $L_n$ with the original threshold T plus the increment $T_0$ when $L_n$ is greater than $(T+T_0)$ whereby said binary signal assumes a zero state, means for reading out the stored generated information digits at some predetermined minimum word position relative to the word position $n$ at which decoding is taking place to provide an output having a very high probability of being the transmitted output before noise disturbance.

8. Apparatus for decoding noise disturbed sequentially encoded binary digital data received in the form of a time sequence of words, each word having one or more information digits and one or more parity digits corresponding to said information digits, means for storing said received words, means for selecting any $n^{th}$ word from said storage, means for generating a plurality of words each word having the same number of digits as said received word, means for determining the likelihood that a generated word is the non-noise disturbed word for each word by comparing said generated word with said $n^{th}$ word, means for converting said likelihood for each word into a quantity $\lambda_{i(n)}$ where $\lambda_0$ is a maximum for the word having the maximum likelihood, means for selecting the maximum available quantity $\lambda_{i(n)}$ at said $n^{th}$ word, means for storing the sum of the $\lambda_{i(n)}$ of the previous $(n-1)$ words, said sum being a quantity $L_n$, means for summing said selected maximum quantity $\lambda_{i(n)}$ at said $n^{th}$ word with said quantity $L_n$ to provide a quantity $L_{n+1}$, a preselected threshold T, a preselected step $T_0$ in in threshold T to provide a preselected stepped threshold $(T+T_0)$, first means for comparing said quantity $L_{n+1}$ with said preselected stepped threshold $(T+T_0)$, means for providing a binary signal F, means for causing said binary signal F to assume a zero state when $$T<L_{n+1}<(T+T_0)$$

means for storing the values of the one or more information digits of the generated word which corresponds to the value of $\lambda_{i(n)}$ which when added to $L_n$ gives a $L_{n+1}$ greater than or equal to thereshold T in said first comparing means, means for causing said selecting means to select the $(n+1)^{th}$ word from storage when $L_{n+1}\geq T$, and means for replacing said $n^{th}$ word in said determining means by said $(n+1)^{th}$ word when $L_{n+1}\geq T$, means for increasing said preselected threshold T by a threshold step $T_0$ to a first new prescribed threshold T when said binary signal F is previously in the zero state and said $L_{n+1}\geq T+T_0$, said increasing means continuing to increase said first new preselected threshold T until $L_{n+1}$ becomes less than $T+T_0$, means for causing said binary signal F to assume a one state when said $L_{n+1}<T$, means for determining the sum of the $\lambda_{i(n)}$ of previous $(n=2)$ words to provide a quantity $L_{n-1}$, means for comparing the amplitude of quantity $L_{n-1}$ with the preselected threshold T, means for reducing said prescribed threshold T by the threshold step $T_0$ to provide a second new prescribed threshold T when $L_{n-1}$ is less than said original prescribed threshold T, means for comparing the number of quantities of $\lambda_{i(n)}$ already tried at word position $n-1$ with the total number of quantities $\lambda_b$ available, said comparison occurring when $L_{n-1}$ is greater than or equal to the orginial threshold T, means for selecting the $(n-2)^{th}$ word when all paths have been tried from $L_{n-1}$, whereby the value of $L_{n-2}$ is substituted for $L_{n-1}$, means for increasing the value of $\lambda_k$ to $\lambda_{k+1}$ when $L_n$ is greater than or equal to the original threshold T and $\lambda_{i(n)}$ is less than $\lambda_b$, means for comparing the value $L_n$ with the original threshold T plus the increment $T_0$ when $L_n$ is greater than or equal to $(T+T_0)$ whereby said binary signal assumes a zero state, means for reading out the stored generated information digits at some predetermined minimum word position relative to the word position $n$ at which decoding is taking place to provide an output having a very high probability of being the transmitted output before noise disturbance.

References Cited

UNITED STATES PATENTS

| | | | |
|---|---|---|---|
| 3,206,747 | 9/1965 | Caspers | 340—347 X |
| 3,235,867 | 2/1966 | Wirth | 340—347 X |
| 3,402,393 | 9/1968 | Massey | 340—146.1 X |

MAYNARD R. WILBUR, Primary Examiner

MICHAEL K. WOLENSKY, Assistant Examiner

U.S. Cl X.R.

340—146.1